United States Patent
Nakano et al.

(10) Patent No.: US 9,102,817 B2
(45) Date of Patent: Aug. 11, 2015

(54) CROSSLINKABLE FLUORINE RUBBER COMPOSITION, FLUORINE RUBBER MOLDED ARTICLE, AND METHOD FOR PRODUCING SAME

(75) Inventors: Yasuhiro Nakano, Settsu (JP); Tomihiko Yanagiguchi, Settsu (JP); Takahiro Kitahara, Settsu (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 0 days.

(21) Appl. No.: 14/241,267

(22) PCT Filed: Aug. 6, 2012

(86) PCT No.: PCT/JP2012/070016
§ 371 (c)(1),
(2), (4) Date: Feb. 26, 2014

(87) PCT Pub. No.: WO2013/046933
PCT Pub. Date: Apr. 4, 2013

(65) Prior Publication Data
US 2014/0378616 A1      Dec. 25, 2014

(30) Foreign Application Priority Data

Sep. 30, 2011   (JP) ................. 2011-218352

(51) Int. Cl.
C08L 27/12    (2006.01)
C08L 27/18    (2006.01)
C08L 15/02    (2006.01)
C08J 3/16     (2006.01)
C08J 3/24     (2006.01)

(52) U.S. Cl.
CPC .. *C08L 15/02* (2013.01); *C08J 3/16* (2013.01); *C08J 3/246* (2013.01); *C08J 2315/02* (2013.01); *C08J 2327/12* (2013.01); *C08J 2327/18* (2013.01); *C08J 2427/18* (2013.01); *C08L 2205/02* (2013.01); *C08L 2205/025* (2013.01); *C08L 2312/00* (2013.01)

(58) Field of Classification Search
CPC . C08L 15/02; C08L 2312/00; C08L 2315/02; C08L 2205/02; C08J 3/246; C08J 2427/18

USPC .................................... 525/199, 200
See application file for complete search history.

(56) References Cited

U.S. PATENT DOCUMENTS

| | | | |
|---|---|---|---|
| 6,310,141 B1 * | 10/2001 | Chen et al. ............. | 525/199 |
| 6,664,336 B1 | 12/2003 | Tomihashi et al. | |
| 8,796,384 B2 * | 8/2014 | Takemura et al. ........ | 525/199 |
| 2010/0256303 A1 | 10/2010 | Comino et al. | |
| 2011/0184126 A1 * | 7/2011 | Takemura et al. ........ | 525/198 |
| 2012/0108753 A1 | 5/2012 | Takemura et al. | |

FOREIGN PATENT DOCUMENTS

| | | |
|---|---|---|
| EP | 2154204 A1 | 2/2010 |
| JP | 2011-504955 A | 2/2011 |
| WO | 00/53675 A1 | 9/2000 |
| WO | 2009/020182 A1 | 2/2009 |
| WO | 2009/057744 A1 | 5/2009 |
| WO | 2011/002080 A1 | 1/2011 |

OTHER PUBLICATIONS

International Preliminary Report on Patentability and Written Opinion of the International Searching Authority issued Apr. 1, 2014 for PCT/JP2012/070016.
International Search Report for International Application No. PCT/JP2012/070016.
Communication dated May 12, 2015, issued by the European Patent Office in counterpart Application No. 12835333.1.

* cited by examiner

*Primary Examiner* — Nathan M Nutter
(74) *Attorney, Agent, or Firm* — Sughrue Mion, PLLC

(57) ABSTRACT

A crosslinkable fluororubber composition containing: a fluororubber (A); and a fluororesin (B), wherein the fluororesin (B) is a copolymer (B1) consisting of tetrafluoroethylene units (a) and hexafluoropropylene units (b) or a copolymer (B2) containing tetrafluoroethylene units (a), hexafluoropropylene units (b), and polymerized units (c) derived from a monomer copolymerizable with tetrafluoroethylene and hexafluoropropylene, the copolymer (B1) satisfies the condition that the ratio (a)/(b) is (80.0 to 87.3)/(12.7 to 20.0) on a molar basis, and the copolymer (B2) satisfies the condition that the ratio (a)/(b) is (80.0 to 90.0)/(10.0 to 20.0) on a molar basis, and the ratio (c)/{(a)+(b)} is (0.1 to 10.0)/(90.0 to 99.9) on a molar basis.

14 Claims, 1 Drawing Sheet

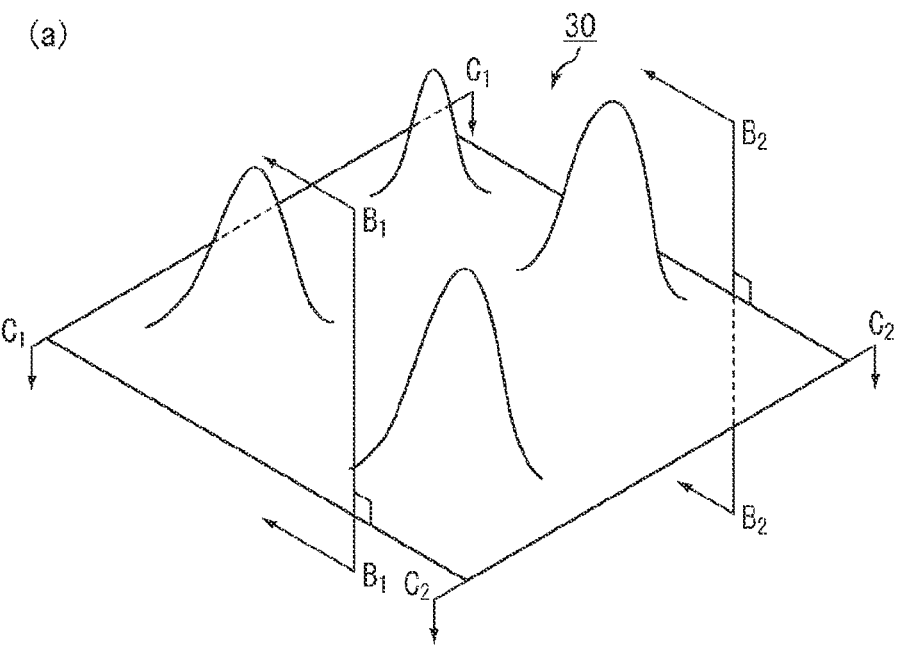
(a)
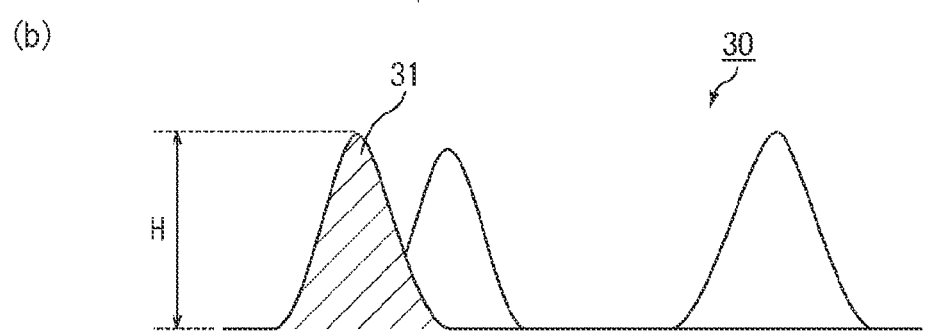
(b)
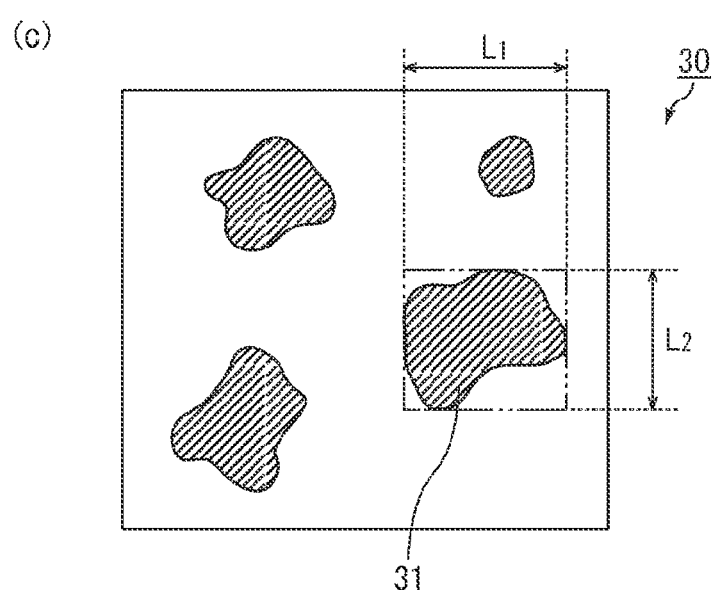
(c)

CROSSLINKABLE FLUORINE RUBBER COMPOSITION, FLUORINE RUBBER MOLDED ARTICLE, AND METHOD FOR PRODUCING SAME

CROSS REFERENCE TO RELATED APPLICATIONS

This application is a National Stage of International Application No. PCT/JP2012/070016, filed on Aug. 6, 2012, which claims priority from Japanese Patent Application No. 2011-218352, filed on Sep. 30, 2011, the contents of all of which are incorporated herein by reference in their entirety.

TECHNICAL FIELD

The present invention relates to crosslinkable fluororubber compositions, fluororubber molded articles obtainable by crosslinking such compositions, and a method for producing such a fluororubber molded article. These are suitably used for various types of sealing materials, sliding members, non-stick members, and members with a water/oil-repellent surface.

BACKGROUND ART

Fluororubber is widely used in a variety of industries including the auto industry, the semiconductor industry, and the chemical industry because of its excellent chemical resistance, solvent resistance, and heat resistance. Specifically, in the auto industry, it is used, for example, for hoses and seal members for engines and peripherals thereof, automatic transmissions, and fuel systems and peripherals thereof.

For applications where low friction is required, for example, as sliding members, more improved fluororubber is still needed because molded articles of rubber have a high-friction, high-tack surface which is attributed to the intrinsic elastomeric properties of rubber.

In light of this, Patent Literature 1 discloses crosslinkable fluororubber compositions containing a fluororubber (A) and a fluororesin (B) which can provide fluororubber molded articles with good mechanical strength and low friction. It states that these crosslinkable compositions are prepared by co-coagulation of the fluororubber (A) and the fluororesin (B).

Patent Literature 2 discloses fluoroelastomer compositions which are easy to process, and are improved in terms of release from a mold, contamination of molds, and molded article surfaces. These compositions specifically contain at least one fluoroelastomer [fluoroelastomer (A)]; at least one melt-processable per(halo)fluoropolymer [polymer (F)] with a melting point of not higher than 250° C. in an amount of 0.1 to 25 phr (relative to the fluoroelastomer (A)); and optionally at least one (per)fluoropolyether [(per)fluoropolyether (E)].

CITATION LIST

Patent Literature

Patent Literature 1: WO 2011/002080
Patent Literature 2: JP 2011-504955 T

SUMMARY OF INVENTION

Technical Problem

An object of the present invention is to provide crosslinkable fluororubber compositions that can provide fluororubber molded articles with low compression set and a low friction surface, molded articles obtainable by crosslinking these compositions, and a method for producing such a molded article.

Solution to Problem

Techniques known so far are designed to provide molded articles with improved characteristics by optimizing the ratio of a fluororubber and a fluororesin, or mixing a fluororubber and a fluororesin in a modified manner as disclosed in Patent Literature 1, and thus are not designed focusing on the monomer composition of fluororesin. The present inventors studied various ways to achieve low compression set and low friction, among the properties required for molded articles, at the same time, and found out that the use of a fluororesin having a specific composition results in molded articles with surprisingly reduced compression set as well as low friction, thereby completing the present invention.

The following may be mentioned as examples of advantages of crosslinkable fluororubber compositions of the present invention: even when more fluororesin is used, compared to conventional techniques, to ensure further lower friction, the intrinsic low compression set of fluororubber is less likely to be affected; and even when the proportional amount of fluororesin is the same as defined in conventional techniques, molded articles with lower compression set can be obtained.

Specifically, the present invention provides a crosslinkable fluororubber composition containing a fluororubber (A); and a fluororesin (B), wherein the fluororesin (B) is a copolymer (B1) consisting of tetrafluoroethylene units (a) and hexafluoropropylene units (b) or a copolymer (B2) containing tetrafluoroethylene units (a), hexafluoropropylene units (b), and polymerized units (c) derived from a monomer copolymerizable with tetrafluoroethylene and hexafluoropropylene, the copolymer (B1) satisfies the condition that the ratio (a)/(b) is (80.0 to 87.3)/(12.7 to 20.0) on a molar basis, and the copolymer (B2) satisfies the condition that the ratio (a)/(b) is (80.0 to 90.0)/(10.0 to 20.0) on a molar basis, and the ratio (c)/{(a)+(b)} is (0.1 to 10.0)/(90.0 to 99.9) on a molar basis.

In one preferred embodiment, the crosslinkable fluororubber composition of the present invention contains co-coagulated powder obtainable by co-coagulation of the fluororubber (A) and the fluororesin (B), and the fluororesin (B) is the copolymer (B1).

In another preferred embodiment, the crosslinkable fluororubber composition of the present invention contains co-coagulated powder obtainable by co-coagulation of the fluororubber (A) and the fluororesin (B), and the fluororesin (B) is the copolymer (B2).

The present invention further provides a method for producing a fluororubber molded article which includes the steps of: (I) co-coagulating a fluororubber (A) and a fluororesin (B), thereby providing co-coagulated powder, and then preparing a crosslinkable fluororubber composition; (II) molding and crosslinking the crosslinkable fluororubber composition, thereby providing a crosslinked molded article; and (III) heating the crosslinked molded article to a temperature of not lower than the melting point of the fluororesin (B), thereby providing a fluororubber molded article.

Advantageous Effects of Invention

The crosslinkable fluororubber compositions of the present invention can provide fluororubber molded articles with low compression set and a low friction surface which are attributed to the above-mentioned features of the compositions. Fluororubber molded articles of the present invention have low compression set as well as a low friction surface, and are useful as sealing materials, sliding members, non-stick members, and members with a water/oil-repellent surface.

BRIEF DESCRIPTION OF DRAWINGS

FIG. 1(a) is a perspective view schematically illustrating projecting portions of a fluororubber molded article, FIG. 1(b) is a cross-sectional view of a projecting portion 31 taken along a plane containing lines $B_1$ and $B_2$ which are perpendicular to the surface shown in FIG. 1(a), and FIG. 1(c) is a cross-sectional view taken along a plane containing lines $C_1$ and $C_2$ which are parallel to the surface shown in FIG. 1(a).

DESCRIPTION OF EMBODIMENTS

The cross-linkable fluororubber compositions of the present invention are crosslinkable fluororubber compositions containing a fluororubber (A) and a fluororesin (B). The crosslinkable fluororubber compositions of the present invention can be prepared by separately preparing coagulated powder of the fluororubber (A) and coagulated powder of the fluororesin (B) and mixing these powders, melt-mixing the fluororubber (A) and the fluororesin (B), co-coagulating the fluororubber (A) and the fluororesin (B), or other methods.

In order to obtain crosslinkable fluororubber compositions in which the fluororesin (B) is homogeneously dispersed, and to provide fluororubber molded articles with lower compression set, lower friction, better non-stick properties, and better water/oil repellency, the crosslinkable fluororubber compositions of the present invention preferably contain co-coagulated powder obtainable by co-coagulation of the fluororubber (A) and the fluororesin (B).

It is assumed that in cross-linkable fluororubber compositions of the present invention containing co-coagulated powder obtainable by co-coagulation of the fluororubber (A) and the fluororesin (B), the fluororesin (B) is homogeneously dispersed. This structure may account for lower compression set and further lower friction of fluororubber molded articles obtained by crosslinking the crosslinkable fluororubber compositions of the present invention. In addition, this structure ensures good non-stick properties and good water/oil repellency as well.

The co-coagulation can be accomplished by, for example, (i) mixing an aqueous dispersion of the fluororubber (A) and an aqueous dispersion of the fluororesin (B), and then causing the fluororubber (A) and the fluororesin (B) to coagulate, (ii) adding powder of the fluororubber (A) to an aqueous dispersion of the fluororesin (B), and then causing the fluororubber (A) and the fluororesin (B) to coagulate, or (iii) adding powder of the fluororesin (B) to an aqueous dispersion of the fluororubber (A), and then causing the fluororubber (A) and the fluororesin (B) to coagulate.

The method (i) is preferred among the above co-coagulation methods because this method allows each of the resins to be homogeneously dispersed. In particular, preferred is the co-coagulated powder obtained by mixing an aqueous dispersion of the fluororubber (A) and an aqueous dispersion of the fluororesin (B), causing the fluororubber (A) and the fluororesin (B) to coagulate, recovering the coagulate, and as desired, drying the coagulate.

(A) Fluororubber

The fluororubber (A) typically contains an amorphous polymer that contains fluorine atoms linking to carbon atoms of the main chain and has rubber elasticity. The fluororubber (A) may contain a single polymer or two or more types of polymers.

Preferably, the fluororubber (A) contains at least one selected from the group consisting of vinylidene fluoride (VdF)/hexafluoropropylene (HFP) copolymers, VdF/HFP/tetrafluoroethylene (TFE) copolymers, TFE/propylene copolymers, TFE/propylene/VdF copolymers, ethylene/HFP copolymers, ethylene/HFP/VdF copolymers, ethylene/HFP/TFE copolymers, VdF/TFE/perfluoro(alkyl vinyl ether) (PAVE) copolymers, and VdF/chlorotrifluoroethylene (CTFE) copolymers. In particular, the fluororubber preferably contains a copolymer containing VdF units.

The following describes fluororubbers which contain a copolymer containing vinylidene fluoride (VdF) units (hereinafter, also referred to as "VdF fluororubbers"). VdF fluororubbers are intended to include fluororubbers containing at least polymerized unit derived from vinylidene fluoride.

The copolymer containing VdF units is preferably a copolymer containing VdF units and copolymerized units derived from a fluorine-containing ethylenic monomer (other than the VdF units). In one embodiment, the copolymer containing VdF units preferably further contains copolymerized units derived from a monomer copolymerizable with VdF and the fluorine-containing ethylenic monomer.

The copolymer containing VdF units preferably contains 30 to 90 mol % of VdF units and 70 to 10 mol % of copolymerized units derived from a fluorine-containing ethylenic monomer. More preferably, the copolymer containing VdF units contains 30 to 85 mol % of VdF units and 70 to 15 mol % of copolymerized units derived from a fluorine-containing ethylenic monomer, still more preferably 30 to 80 mol % of VdF units and 70 to 20 mol % of copolymerized units derived from a fluorine-containing ethylenic monomer. The amount of copolymerized units derived from a monomer copolymerizable with VdF and the fluorine-containing ethylenic monomer is preferably 0 to 10 mol % relative to the total amount of VdF units and copolymerized units derived from a fluorine-containing ethylenic monomer.

Examples of the fluorine-containing ethylenic monomer include fluorine-containing monomers such as TFE, CTFE, trifluoroethylene, HFP, trifluoropropylene, tetrafluoropropylene, pentafluoropropylene, trifluorobutene, tetrafluoroisobutene, PAVE, vinyl fluoride, and fluorovinylethers represented by the formula (1):

(in the formula, Xs, which may be the same or different, are independently H, F, or $CF_3$, $R^1$ is a linear or branched C1-C6 fluoroalkyl group optionally containing one or two atoms selected from the group consisting of H, Cl, Br, and I, or a C5 or C6 cyclic fluoroalkyl group optionally containing one or two atoms selected from the group consisting of H, Cl, Br, and I.) In particular, at least one selected from the group consisting of fluorovinylethers represented by the formula (1), TFE, HFP, and PAVE is preferable, and at least one selected from the group consisting of TFE, HFP, and PAVE is more preferable.

As preferred examples of PAVE, there may be mentioned compounds represented by the formula (2):

(in the formula, $Y^1$ is F or $CF_3$, $R^f$ is a C1-C5 perfluoroalkyl group, p is an integer of 0 to 5, and q is an integer of 0 to 5.)

Among the PAVEs, more preferred is perfluoro(methyl vinyl ether) or perfluoro(propyl vinyl ether), and still more preferred is perfluoro(methyl vinyl ether). Any of these may be used alone, or two or more of these may be used in combination.

Examples of monomers copolymerizable with VdF and the fluorine-containing ethylenic monomer include ethylene, propylene, and alkyl vinyl ethers.

Specific preferred examples of the copolymer containing VdF units include VdF/HFP copolymers, VdF/HFP/TFE copolymers, VdF/CTFE copolymers, VdF/CTFE/TFE copolymers, VdF/PAVE copolymers, VdF/TFE/PAVE copolymers, VdF/HFP/PAVE copolymers, and VdF/HFP/TFE/PAVE copolymers. Any of these copolymers may be used alone, or two or more of these may be used in combination. In terms of heat resistance and non-stick properties, it is preferable that at least one copolymer is selected from VdF/HFP copolymers and VdF/HFP/TFE copolymers among these copolymers containing VdF units. These copolymers preferably satisfy the range of the ratio of VdF units and units derived from a fluorine-containing ethylenic monomer defined above for the copolymer containing VdF units.

As preferred examples of the VdF/HFP copolymers, those having a molar ratio VdF/HFP of (45 to 85)/(55 to 15) may be mentioned. The molar ratio is more preferably (50 to 80)/(50 to 20), and still more preferably (60 to 80)/(40 to 20).

As preferred examples of the VdF/HFP/TFE copolymers, those having a molar ratio VdF/HFP/TFE of (40 to 80)/(10 to 35)/(10 to 35) may be mentioned.

As preferred examples of the VdF/PAVE copolymers, those having a molar ratio VdF/PAVE of (65 to 90)/(10 to 35) may be mentioned.

As preferred examples of the VdF/TFE/PAVE copolymers, those having a molar ratio VdF/TFE/PAVE of (40 to 80)/(3 to 40)/(15 to 35) may be mentioned.

As preferred examples of the VdF/HFP/PAVE copolymers, those having a molar ratio VdF/HFP/PAVE of (65 to 90)/(3 to 25)/(3 to 25) may be mentioned.

As preferred examples of the VdF/HFP/TFE/PAVE copolymers, those having a molar ratio VdF/HFP/TFE/PAVE of (40 to 90)/(0 to 25)/(0 to 40)/(3 to 35) may be mentioned. The molar ratio is more preferably (40 to 80)/(3 to 25)/(3 to 40)/(3 to 25).

In one embodiment, the fluororubber (A) is preferably a copolymer containing copolymerized units derived from a cross-linking-site-imparting monomer. Examples of cross-linking-site-imparting monomers include iodine-containing monomers such as perfluoro(6,6-dihydro-6-iodo-3-oxa-1-hexene) and perfluoro(5-iodo-3-oxa-1-pentene) described in JP H05-63482 B and JP H07-316234 A, bromine-containing monomers described in JP H04-505341 T, cyano group-containing monomers described in JP H04-505345 T and JP H05-500070 T, carboxyl group-containing monomers, and alkoxycarbonyl group-containing monomers.

In one embodiment, the fluororubber (A) preferably contains a fluororubber with an iodine- or bromine-terminated main chain. Such a fluororubber with an iodine- or bromine-terminated main chain can be prepared by emulsion polymerization of monomers which can be initiated by adding a radical initiator in a water medium substantially in the absence of oxygen and in the presence of a halogen compound. Representative examples of usable halogen compounds include compounds represented by the formula:

$R^2I_xBr_y$ (in the formula, x and y are independently an integer of 0 to 2, and satisfy 1≤x+y≤2, $R^2$ is a saturated or unsaturated C1-C16 fluorohydrocarbon, saturated or unsaturated C1-C16 chlorofluorohydrocarbon, or C1-C3 hydrocarbon group optionally containing oxygen atoms).

Examples of halogen compounds include 1,3-diiodoperfluoropropane, 1,3-diiodo-2-chloroperfluoropropane, 1,4-diiodoperfluorobutane, 1,5-diiodo-2,4-dichloroperfluoropentane, 1,6-diiodoperfluorohexane, 1,8-diiodoperfluorooctane, 1,12-diiodoperfluorododecane, 1,16-diiodoperfluorohexadecane, diiodomethane, 1,2-diiodoethane, 1,3-diiodo-n-propane, $CF_2Br_2$, $BrCF_2CF_2Br$, $CF_3CFBrCF_2Br$, $CFClBr_2$, $BrCF_2CFClBr$, $CFBrClCFClBr$, $BrCF_2CF_2CF_2Br$, $BrCF_2CFBrOCF_3$, 1-bromo-2-iodine perfluoroethane, 1-bromo-3-iodine perfluoropropane, 1-bromo-4-iodine perfluorobutane, 2-bromo-3-iodine perfluorobutane, 3-bromo-4-iodine perfluorobutene-1, 2-bromo-4-iodine perfluorobutene-1, monoiodo-substituted and monobromo-substituted benzenes, diiodo-substituted and monobromo-substituted benzenes, and (2-iodoethyl)-substituted and (2-bromoethyl)-substituted benzenes. Any of these compounds may be used alone, or any combination of these may be used.

Among these, 1,4-diiodoperfluorobutane and diiodomethane are preferred because of their properties such as polymerization reactivity, crosslinking reactivity, and easy availability.

For ease of processing, the fluororubber (A) preferably has a Mooney viscosity ($ML_{1+10}$ (121° C.)) of 5 to 140, more preferably 10 to 120, and still more preferably 20 to 100.

A crosslinkable system of the fluororubber (A) is preferably at least one selected from the group consisting of, for example, peroxide crosslinkable systems and polyol crosslinkable systems.

A peroxide crosslinkable system is preferable in terms of chemical resistance, and a polyol crosslinkable system is preferable in terms of heat resistance. Crosslinking agents usable for these crosslinkable systems may also be contained in the crosslinkable fluororubber compositions. The amount of crosslinking agent used is determined depending on the type of the crosslinking agent, but is preferably 0.2 to 5.0 parts by mass, and more preferably 0.3 to 3.0 parts by mass relative to 100 parts by mass of the fluororubber (A).

For peroxide crosslinking, a peroxide-crosslinkable fluororubber is used in combination with an organic peroxide as the crosslinking agent.

The peroxide crosslinkable fluororubber is not particularly limited, and any fluororubber containing a peroxide crosslinkable site may be used. The peroxide crosslinkable site is also not particularly limited, and examples thereof include sites containing an iodine atom, and sites containing a bromine atom.

The organic peroxide may be any organic peroxide, provided that it can easily generate peroxy radicals in the presence of heat or a redox system. Examples thereof include 1,1-bis(t-butylperoxy)-3,5,5-trimethylcyclohexane, 2,5-dimethylhexane-2,5-dihydroperoxide, di-t-butyl peroxide, t-butylcumyl peroxide, dicumyl peroxide, α,α-bis(t-butylperoxy)-p-diisopropylbenzene, 2,5-dimethyl-2,5-di(t-butylperoxy)hexane, 2,5-dimethyl-2,5-di(t-butylperoxy)-hexyne-3, benzoyl peroxide, t-butylperoxybenzene, t-butylperoxy maleic acid, t-butylperoxyisopropyl carbonate, and t-butylperoxybenzoate. Among these, 2,5-dimethyl-2,5-di(t-butylperoxy)hexane and 2,5-dimethyl-2,5-di(t-butylperoxy)-hexyne-3 are preferable.

The amount of organic peroxide used is preferably 0.1 to 15 parts by mass, and more preferably 0.3 to 5 parts by mass relative to 100 parts by mass of the fluororubber (A).

In the case of an organic peroxide being used as a crosslinking agent, the crosslinkable fluororubber compositions of the present invention preferably further contain a crosslinking aid. Examples of crosslinking aids include triallyl cyanurate, triallyl isocyanurate (TAIC), triacrylformal, triallyl trimellitate, N,N'-m-phenylene bismaleimide, dipropargyl terephthalate, diallyl phthalate, tetraallyl terephthalate amide, triallyl phosphate, bismaleimide, fluorinated triallyl isocyanurate (1,3,5-tris(2,3,3-trifluoro-2-propenyl)-1,3,5-triazine-2,4,6-trione), tris(diallylamine)-s-triazine, triallyl phosphite, N,N-diallylacrylamide, 1,6-divinyldodecafluorohexane, hexallylphosphoramide, N,N,N',N'-tetraallylphthalamide, N,N,N',N'-tetraallyl malonamide, trivinyl isocyanurate, 2,4,6-trivinylmethyltrisiloxane, tri(5-norbornene-2-methylene) cyanurate, and triallyl phosphite. Among these, triallyl isocyanurate (TAIC) is preferable because it ensures good crosslinkability, mechanical properties, and sealing performance.

The amount of crosslinking aid used is 0.01 to 10 parts by mass, and preferably 0.1 to 5.0 parts by mass relative to 100 parts by mass of the fluororubber (A). The use of a crosslinking aid in an amount of less than 0.01 parts by mass may result in reduced mechanical properties and poor sealing performance, and the use thereof in an amount of more than 10 parts by mass may result in reduced heat resistance and provide fluororubber molded articles with reduced durability.

For polyol crosslinking, a polyol-crosslinkable fluororubber is used in combination with a polyhydroxy compound as a crosslinking agent.

The polyol-crosslinkable fluororubber is not particularly limited, and any fluororubber having a polyol crosslinkable site can be used. The polyol crosslinkable site is also not particularly limited, and examples thereof include sites containing a vinylidene fluoride (VdF) unit. The crosslinkable site can be incorporated in a fluororubber, for example, by a method in which a cross-linking-site-imparting monomer is also copolymerized in polymerization into the fluororubber.

As the polyhydroxy compound, polyhydroxy aromatic compounds are suitably used because of their good heat resistance.

The polyhydroxy aromatic compounds are not particularly limited, and examples thereof include 2,2-bis(4-hydroxyphenyl)propane (hereinafter referred to as bisphenol A), 2,2-bis(4-hydroxyphenyl)perfluoropropane (hereinafter referred to as bisphenol AF), resorcin, 1,3-dihydroxybenzene, 1,7-dihydroxynaphthalene, 2,7-dihydroxynaphthalene, 1,6-dihydroxynaphthalene, 4,4'-dihydroxydiphenyl, 4,4'-dihydroxystilbene, 2,6-dihydroxyanthracene, hydroquinone, catechol, 2,2-bis(4-hydroxyphenyl)butane (hereinafter referred to as bisphenol B), 4,4-bis(4-hydroxyphenyl)valeric acid, 2,2-bis(4-hydroxyphenyl)tetrafluorodichloropropane, 4,4'-dihydroxydiphenylsulfone, 4,4'-dihydroxydiphenyl ketone, tri(4-hydroxyphenyl)methane, 3,3',5,5'-tetrachlorobisphenol A, and 3,3',5,5'-tetrabromobisphenol A. These polyhydroxy aromatic compounds may be in the form of their metal salts such as alkali metal salts and alkaline earth metal salts. However, in the case where the copolymer is coagulated in the presence of an acid, it is preferable not to use the metal salts. The amount of polyhydroxyaromatic compound used is 0.1 to 15 parts by mass, and preferably 0.5 to 5 parts by mass relative to 100 parts by mass of the fluororubber (A).

In the case of a polyhydroxy compound being used as a crosslinking agent, the crosslinkable fluororubber compositions preferably further contain a crosslinking promoter. The crosslinking promoter accelerates the formation of intramolecular double bonds via the dehydrofluorination reaction of the polymer main chain and addition of the polyhydroxy compound to the resulting double bonds.

Examples of the crosslinking promoter include onium compounds. Preferred among the onium compounds is at least one selected from the group consisting of ammonium compounds such as quaternary ammonium salts, phosphonium compounds such as quaternary phosphonium salts, oxonium compounds, sulfonium compounds, cyclic amines, and monofunctional amine compounds. More preferred is at least one selected from the group consisting of quaternary ammonium salts and quaternary phosphonium salts.

The quaternary ammonium salts are not particularly limited. For example, mention may be made of 8-methyl-1,8-diazabicyclo[5,4,0]-7-undecenium chloride, 8-methyl-1,8-diazabicyclo[5,4,0]-7-undecenium iodide, 8-methyl-1,8-diazabicyclo[5,4,0]-7-undecenium hydroxide, 8-methyl-1,8-diazabicyclo[5,4,0]-7-undecenium methylsulfate, 8-ethyl-1,8-diazabicyclo[5,4,0]-7-undecenium bromide, 8-propyl-1,8-diazabicyclo[5,4,0]-7-undecenium bromide, 8-dodecyl-1,8-diazabicyclo[5,4,0]-7-undecenium chloride, 8-dodecyl-1,8-diazabicyclo[5,4,0]-7-undecenium hydroxide, 8-eicosyl-1,8-diazabicyclo[5,4,0]-7-undecenium chloride, 8-tetracosyl-1,8-diazabicyclo[5,4,0]-7-undecenium chloride, 8-benzyl-1,8-diazabicyclo[5,4,0]-7-undecenium chloride (hereinafter, referred to as "DBU-B"), 8-benzyl-1,8-diazabicyclo[5,4,0]-7-undecenium hydroxide, 8-phenethyl-1,8-diazabicyclo[5,4,0]-7-undecenium chloride, and 8-(3-phenylpropyl)-1,8-diazabicyclo[5,4,0]-7-undecenium chloride. Among these, DBU-B is preferable in terms of crosslinkability, physical properties, and sealing performance.

The quaternary phosphonium salts are not particularly limited, and mention may be made, for example, of tetrabutylphosphonium chloride, benzyltriphenylphosphonium chloride (hereinafter referred to as "BTPPC"), benzyltrimethylphosphonium chloride, benzyltributylphosphonium chloride, tributylallylphosphonium chloride, tributyl-2-methoxypropylphosphonium chloride, and benzylphenyl (dimethylamino)phosphonium chloride. Among these, benzyltriphenylphosphonium chloride (BTPPC) is preferable in terms of crosslinkability, physical properties, and sealing performance.

Other examples of the crosslinking promoter include solid solutions of quaternary ammonium salts with bisphenol AF, solid solutions of quaternary phosphonium salts with bisphenol AF, and the chlorine-tree crosslinking promoters disclosed in JP H11-147891 A.

The crosslinking promoter is preferably used in an amount of 0.01 to 8 parts by mass, more preferably 0.02 to 5 parts by mass, relative to 100 parts by mass of the fluororubber (A). The use of the crosslinking promoter in an amount of less than 0.01 parts by mass may not allow the fluororubber to be crosslinked to a sufficient extent, therefore may provide fluororubber molded articles with poor properties (e.g. poor heat resistance). The use thereof in an amount of more than 8 parts by mass may reduce the moldability/processability of the crosslinkable fluororubber compositions, and lead to reduced elongation performance, among mechanical properties, and reduced sealing performance.

(B) Fluororesin

The fluororesin (B) is a copolymer having a specific composition containing tetrafluoroethylene units and hexafluoropropylene units. The use of the fluororesin (B) having a specific composition provides a lower friction surface to molded articles made from crosslinkable fluororubber compositions of the present invention, and also provides lower compression set to the molded articles. Additionally, the fluororesin (B)

provides improved surface abrasion resistance and non-stick properties to the molded articles.

Other advantages of the copolymer consisting of tetrafluoroethylene units and hexafluoropropylene units are that this copolymer is highly compatible with the fluororubber (A), and provides good heat resistance to fluororubber molded articles. A further advantage thereof is that it provides good fuel barrier performance to fluororubber molded articles of the present invention intended for use as, for example, hoses in fuel systems in the automobile-related fields.

In the case where the fluororesin (B) is a polymer consisting of tetrafluoroethylene (TFE) units (a) and hexafluoropropylene (HFP) units (b), the ratio TFE units (a)/HFP units (b) is (80.0 to 87.3)/(12.7 to 20.0) on a molar basis. This polymer is referred to as a copolymer (B1). In the case where the composition of the fluororesin (B) satisfies the above-mentioned range, fluororubber molded articles with remarkably reduced compression set are provided.

For lower compression set and better mechanical properties, the ratio (a)/(b) in the fluororesin (B1) is preferably (82.0 to 87.0)/(13.0 to 18.0), more preferably (83.0 to 86.5)/(13.5 to 17.0), and still more preferably (83.0 to 86.0)/(14.0 to 17.0) on a molar basis. If the ratio (a)/(b) is too large, fluororubber molded articles having sufficiently low compression set may not be obtained. If the ratio (a)/(b) is too small, mechanical properties may be reduced.

In the case where the fluororesin (B) is a copolymer containing tetrafluoroethylene units (a), hexafluoropropylene units (b), and polymerized units (c) derived from a monomer copolymerizable with tetrafluoroethylene and hexafluoropropylene, the ratio (a)/(b) in the fluororesin (B) is (80.0 to 90.0)/(10.0 to 20.0) on a molar basis, and the ratio (c)/{(a)+(b)} in the fluororesin is (0.1 to 10.0)/(90.0 to 99.9) on a molar basis. This copolymer is referred to as a copolymer (B2) ({a}+(b)} means the total of tetrafluoroethylene units (a) and hexafluoropropylene units (b)). Remarkably low compression set can be achieved when the ratio (a)/(b) is (80.0 to 90.0)/(10.0 to 20.0) on a molar basis, and the ratio (c)/{(a)+(b)} is (0.1 to 10.0)/(90.0 to 99.9) on a molar basis.

For lower compression set and better mechanical properties, the ratio (a)/(b) in the fluororesin (B2) is preferably (82.0 to 88.0)/(12.0 to 18.0), and more preferably (84.0 to 88.0)/(12.0 to 16.0) on a molar basis. If the ratio TFE units (a)/HFP units (b) is too large, fluororubber molded articles with sufficiently low compression set may not be obtained. Additionally, the compositions may have too high a melting point, and therefore may not be easily molded. If the ratio TFE units (a)/HFP units (b) is too small, the mechanical properties may be reduced.

The ratio (c)/{(a)+(b)} in the fluororesin (B2) is preferably (0.3 to 8.0)/(92.0 to 99.7) on a molar basis.

Examples of monomers copolymerizable with TFE and HFP include perfluoro(alkyl vinyl ethers) [PAVEs] represented by the formula:

$$CF_2=CF-ORf^6$$

(wherein $Rf^6$ is a C1 to C5 perfluoroalkyl group), vinyl monomers represented by the formula:

$$CX^5X^6=CX^7(CF_2)_nX^8$$

(wherein, $X^5$, $X^6$, and $X^7$, which may be the same or different, are independently a hydrogen or fluorine atom, $X^8$ is a hydrogen, fluorine, or chlorine atom, and n is an integer of 2 to 10), and alkyl perfluoro vinyl ether derivatives represented by the formula:

$$CF_2=CF-OCH_2-Rf^7$$

(wherein $Rf^7$ is a C1 to C5 perfluoroalkyl group.) PAVEs are preferable among others.

As preferred examples of PAVEs, there may be mentioned at least one selected from the group consisting of perfluoro (methyl vinyl ether) (PMVE), perfluoro(ethyl vinyl ether) (PEVE), perfluoro(propyl vinyl ether) (PPVE), and perfluoro (butyl vinyl ether). In particular, at least one selected from the group consisting of PMVE, PEVE and PPVE is more preferable.

As preferred examples of the alkyl perfluorovinyl ether derivatives, there may be mentioned derivatives in which $Rf^7$ is a C1 to C3 perfluoroalkyl group. $CF_2=CF-OCH_2-CF_2CF_3$ is more preferable.

The polymerized units (c) derived from a monomer copolymerizable with tetrafluoroethylene and hexafluoropropylene in the fluororesin (B2) are preferably perfluoro(alkyl vinyl ether) units. The fluororesin (B2) is preferably a copolymer consisting of tetrafluoroethylene units, hexafluoropropylene units, and perfluoro(alkyl vinyl ether) units.

The fluororesin (B) preferably has a melting point of not higher than 210° C. The melting point of the fluororesin (B) is preferably not lower than the crosslinking temperature of the fluororubber (A), more preferably 130° C. to 210° C., still more preferably 150° C. to 200° C., and particularly preferably 160° C. to 190° C. If the melting point of the fluororesin (B) is lower than 130° C., the fluororesin (B) bleeds out to the surface in the process of crosslinking molding. Consequently, fluororubber molded articles with enough projecting portions may not be obtained, and therefore sufficiently low friction, abrasion resistance, and non-stick properties may not be achieved. If the melting point is higher than 210° C., the fluororesin has a high storage elastic modulus, which may affect the low compression set of fluororubber molded articles.

The fluororesin (B) preferably has a melt flow rate [MFR] of not less than 0.1 g/10 minutes. If the MFR is less than 0.1 g/10 minutes, the fluororesin (B) may be difficult to precipitate on the surface of fluororubber molded articles.

In order to obtain fluororubber molded articles with low compression set, the fluororesin (B) preferably has a storage elastic modulus (E'), as determined by a dynamic viscoelasticity analysis at 70° C., of 10 to 160 MPa.

The storage elastic modulus is a value determined at 70° C. by a dynamic viscoelasticity analysis, and more specifically is a value determined by analyzing a sample with a length of 30 mm, a width of 5 mm, and a thickness of 0.5 mm using a dynamic viscoelasticity analyzer DVA 220 (IT keisoku seigyo K.K.) in a tensile mode with a supporting span of 20 mm at a temperature increase rate of 2° C./min from 25° C. to 200° C. at 1 Hz. The storage elastic modulus (E') at 70° C. is preferably in the range of 10 to 160 MPa, more preferably in the range of 20 to 140 MPa, and still more preferably in the range of 30 to 100 MPa.

In order to improve the compatibility of the fluororesin (B) and the fluororubber (A), the crosslinkable fluororubber compositions of the present invention may contain at least one polyfunctional compound. The term "polyfunctional compound" means a compound having at least two functional groups of the same structure or different structures in its molecule.

Examples of functional groups of such polyfunctional compounds include carbonyl, carboxyl, haloformyl, amido, olefin, amino, isocyanate, hydroxy, and epoxy groups, and any of general functional groups known to be reactive are acceptable. Compounds having these functional groups have high affinity for the fluororubber (A), and additionally are expected to further improve the compatibility because they react with a functional group of the fluororesin (B) which is known to be reactive.

In the crosslinkable fluororubber compositions, the fluororubber (A) is preferably present in an amount of 60 to 97% by mass. If the amount of the fluororubber is too small, fluororubber molded articles possessing rubber characters may not be obtained. If the amount of the fluororubber (A) is too large, fluororubber molded articles with low friction may not be obtained.

The volume ratio between the fluororubber (A) and the fluororesin (B) (fluororubber (A)/fluororesin (B)) in the crosslinkable fluororubber compositions of the present invention is preferably 97/3 to 60/40. Too little fluororesin (B) may not provide a sufficiently low friction surface and sufficient abrasion resistance and non-stick properties to molded articles. Too much fluororesin (B) may result in insufficiently low compression set. For low compression set, low friction surfaces, good abrasion resistance, and good non-stick properties, the volume ratio (A)/(B) is more preferably 95/5 to 65/35, and still more preferably 90/10 to 70/30.

The crosslinkable fluororubber compositions may optionally contain compounding agents commonly used in fluororubbers, including various additives such as fillers, processing aids, plasticizers, colorants, stabilizers, adhesive aids, mold release agents, electric conductivity imparting agents, thermal conductivity imparting agents, surface non-adhesive agents, flexibility imparting agents, heat resistance improvers, and flame retardants, to the extent that the effects of the present invention are not impaired.

The crosslinkable fluororubber compositions of the present invention should be free from fluorine-containing thermoplastic elastomers.

Fluororubber molded articles of the present invention are obtainable by crosslinking the crosslinkable fluororubber compositions containing the fluororubber (A) and the fluororesin (B).

The fluororubber molded articles of the present invention are made from the crosslinkable fluororubber compositions, and therefore have low compression set and very low friction. Additionally, they are excellent in abrasion resistance and non-stick properties.

In addition, because there is no clear interface between the fluororesin and the fluororubber in the fluororubber molded articles, surface portions rich in the fluororesin will not come off or chip off.

The fluororubber molded articles of the present invention are not limited, provided that they are formed by crosslinking the crosslinkable fluororubber compositions containing the fluororubber (A) and the fluororesin (B). Preferably, the molded articles are formed in a manner described below.

For example, a crosslinkable fluororubber composition which contains co-coagulated powder obtained by co-coagulation of the fluororubber (A) and the fluororesin (B) having a specific composition is crosslinked, and the crosslinked product is heated under specific conditions. This method provides fluororubber molded articles with a low friction surface, good non-stick properties, good water/oil repellency, and low compression set.

The fluororubber molded articles of the present invention are preferably provided with projecting portions on the surface. Fluororubber molded articles with projecting portions on the surface exhibit remarkably low friction, good abrasion resistance, and good non-stick properties.

Preferably, the projecting portions are substantially formed of the fluororesin (B), which is a component of the crosslinkable fluororubber compositions. The projecting portions can be formed, for example, by a later-described method in which the fluororesin (B) in a crosslinkable fluororubber composition is deposited on the surface.

There is no clear interface or the like where the fluororubber molded article main body and the projecting portions meet, in other words, the projecting portions are integrated parts of the fluororubber molded articles. This structure has the advantage of more certainly preventing projecting portions from coming off or chipping off.

The fact that the projecting portions are substantially formed of the fluororesin (B) contained in the crosslinkable compositions can be confirmed from the ratio between peak intensities derived from the fluororubber (A) and the fluororesin (B). The peak intensity ratio can be determined by IR analysis or ESCA analysis. For example, the ratio between the characteristic absorption peak intensity derived from the fluororubber (A) and the characteristic absorption peak intensity derived from the fluororesin (B) (peak intensity ratio of components) is determined by IR analysis for projecting portions and for a part other than the projecting portions in an area including projecting portions. In this case, the peak intensity ratio (=(peak intensity of projecting portion)/(peak intensity of part other than projecting portion)) should be not less than 1.2, and preferably not less than 1.5.

With reference to the figures, the shapes of the projecting portions are described in more detail.

FIG. 1(a) is a perspective view schematically illustrating projecting portions of a fluororubber molded article, FIG. 1(b) is a cross-sectional view of a projecting portion 31 taken along a plane containing lines $B_1$ and $B_2$ which are perpendicular to the surface shown in FIG. 1(a), and FIG. 1(c) is a cross-sectional view taken along a plane containing lines $C_1$ and $C_2$ which are parallel to the surface shown in FIG. 1(a). FIGS. 1(a) to (c) schematically depict a micro-region of the surface of the fluororubber molded article. As shown in FIGS. 1(a) to (c), there are projecting portions 31 with, for example, a substantially conical shape (cone shape) on the surface of the fluororubber molded article.

Herein, the height of the projecting portions 31 refers to the height of parts projecting from the surface of a fluororubber molded article ("H" in FIG. 1(b)). The cross-sectional area of the bottoms of the projecting portions 31 refers to the area of the cross sections of the projecting portions 31 taken along a plane (a plane containing lines C1 and C2) which is parallel to the surface of the fluororubber molded article (see FIG. 1 (c)).

The area ratio of the areas covered with projecting portions to the entire surface of a fluororubber molded article is preferably not less than 0.03 (3%). The area ratio is more preferably not less than 0.15 (15%), and still more preferably not less than 0.30 (30%). The area ratio of the areas covered with projecting portions to the entire surface of a fluororubber molded article refers to the area-based occupancy of the projecting portions on the cutting plane that is used to determine the cross-sectional area of the bottoms of the projecting portions.

In the fluororubber molded articles of the present invention, the fluororesin (B) is preferably present at a volume ratio of 0.03 to 0.40 (3 to 40% by volume) relative to the fluororubber molded articles. The lower limit of the volume ratio is more preferably 0.05 (5% by volume), and still more preferably 0.10 (10% by volume). The upper limit of the volume ratio is more preferably 0.35 (35% by volume), and still more preferably 0.30 (30% by volume). The fluororesin (B), which is a copolymer containing polymerized units derived from tetrafluoroethylene and polymerized units derived from hexafluoropropylene, has good heat resistance. Accordingly, the resin is not decomposed in crosslinking molding or heat treatment. This means that the above-mentioned volume ratio can be regarded as the same as the volume ratio of the fluororesin in the crosslinkable compositions.

The area ratio of the areas covered with projecting portions is preferably 1.2 times or more, more preferably 1.3 times or more larger than the volume ratio of the fluororesin (B). This means that the ratio of the areas covered with projecting portions to the entire surface of the fluororubber molded articles of the present invention is higher than the volume ratio of the fluororesin (B) in the molded articles, and also, the volume ratio of the fluororesin (B) in the crosslinkable fluororubber compositions.

As long as this feature is satisfied, the abrasion resistance, low friction, non-stick properties, which cannot be afforded by the fluororubber, are improved without loss of the advantageous features of the fluororubber even when the proportional amount of the fluororesin in the fluororubber molded articles of the present invention is small. Additionally, low compression set can also be provided. The effects of the present invention can be obtained as long as the fluororubber molded articles satisfy the range of the area ratio of areas covered with projecting portions in the region where low friction, abrasion resistance, or non-stick properties are required for the intended use.

Preferably, the projecting portions have a height of 0.1 to 30.0 μm. Projecting portions with a height in this range provide low friction, good abrasion resistance, and good non-stick properties. The height is more preferably 0.3 to 20.0 μm, and still more preferably 0.5 to 10.0 μm.

The projecting portions preferably have a bottom with a cross-sectional area of 0.1 to 2000 $\mu m^2$. Projecting portions with a bottom cross-sectional area within this range provide good abrasion resistance, low friction, and good non-stick properties. The bottom cross-sectional area is more preferably 0.3 to 1500 $\mu m^2$, and still more preferably 0.5 to 1000 $\mu m^2$.

The standard deviation of the height of the projecting portions of the fluororubber molded articles of the present invention is preferably not more than 0.300. In the case where the standard deviation is within this range, more improved abrasion resistance, low friction properties, and non-stick properties can be achieved.

The fluororubber molded articles are preferably provided with 500 to 60000 projecting portions/$mm^2$. In the case where the number of projecting portions is within this range, the fluororubber molded articles have more improved abrasion resistance, low friction properties, and non-stick properties.

The area ratio of areas covered with projecting portions, height of projecting portions, bottom cross-sectional area of projecting portions, and the number of projecting portions can be calculated, for example, using a color 3D laser microscope (VK-9700) available from Keyence Corporation and an analysis software WinRooF Ver. 6.4.0 available from Mitani Corporation. The area ratio of areas covered with projecting portions is calculated by determining the bottom cross-sectional areas of projecting portions, and calculating the proportion of the total of the cross-sectional areas to the area of the entire measured region. The number of projecting portions is determined by converting the number of projecting portions in a measured region to the number of projecting portions per $mm^2$.

The fluororubber molded articles of the present invention should have projecting portions on at least part of the surface, in other words, the fluororubber molded articles may have a region without projecting portions on the surface. Projecting portions are not necessary, for example, on a region where properties such as abrasion resistance, low friction properties, and non-stick properties are not required.

The fluororubber molded articles of the present invention are useful for applications where their low compression set, low friction surfaces, non-stick properties, and water/oil-repellency (high contact angle) are needed, specifically are useful as sealing materials, sliding members, and non-stick members.

Examples thereof include, but not limited to, the following molded articles.

Sealing Materials:

In the fields relating to semiconductor production such as semiconductor producing devices, liquid crystal panel producing devices, plasma panel producing devices, plasma-addressed liquid crystal panels, field emission display panels, and solar battery substrates, examples include O (square)-rings, packing members, gaskets, diaphragms, and other various sealing materials. These sealing materials can be used for CVD devices, dry etching devices, wet etching devices, oxidation diffusion devices, sputtering devices, ashing devices, washing devices, ion implanting devices, and gas discharging devices. Specific examples include O-rings for gate valves, O-rings for quartz windows, O-rings for chambers, O-rings for gates, O-rings for bell jars, O-rings for couplings, O-rings and diaphragms for pumps, O-rings for semiconductor gas control devices, O-rings for resist developers and peeling liquids, and other various sealing materials.

In the field of automobiles, the fluororubber molded articles can be used, for example, as sealing materials such as gaskets, shaft seals, valve stem seals, or other various sealing materials for engines and the peripheral devices thereof, or various sealing materials for automatic transmissions. Examples of sealing materials for fuel systems and the peripheral devices thereof include O (square)-rings, packing members, and diaphragms. Specific examples thereof include engine head gaskets, metal gaskets, oil pan gaskets, crankshaft seals, cam shaft seals, valve stem seals, manifold packing members, seals for oxygen sensors, injector O-rings, injector packing members, O-rings and diaphragms for fuel pumps, crankshaft seals, gear box seals, power piston packing members, cylinder liner seals, valve stem seals, automatic transmission front pump seals, rear axle pinion seals, universal joint gaskets, speed meter pinion seals, foot brake piston cups, torque transmission O-rings, oil seals, exhaust gas recirculation system seals, bearing seals, and carburetor sensor diaphragms.

In the airplane, rocket and shipbuilding fields, examples include diaphragms, O (square)-rings, valves, packing members, and other various sealing materials, and these can be used in fuel systems. Specifically, in the airplane field, the molded articles can be used as jet engine valve stem seals, gaskets and O-rings, rotating shaft seals, hydraulic gaskets and fire wall seals and the like; in the shipbuilding field, the molded articles can be used as screw propeller shaft stern seals, diesel engine suction and exhaust valve stem seals, butterfly valve seals, butterfly valve shaft seals and the like.

Examples of sealing materials in the chemical plant field include valves, packing members, diaphragms, O (square)-rings, and other various sealing materials, and these can be used in various steps of producing medicinal chemicals, agrochemicals, paints, resins, and the like. More specifically, the molded articles can be used as seals in chemical pumps, flowmeters and piping systems, heat exchanger seals, glass cooler packing members in sulfuric acid production plants, seals in agrochemical spreaders and agrochemical transfer pumps, gas piping seals, plating bath seals, high-temperature vacuum drier packing members, papermaking belt roller seals, fuel cell seals, wind tunnel joint seals, tube joining part packing members in gas chromatographs and pH meters, and seals, diaphragms and valve parts in analytical apparatus and physical and chemical apparatus.

In the photographic field (e.g. developing machines), the printing field (e.g. printing machines) and the painting field (e.g. painting equipment), the molded articles can be used, for example, as seals and valve parts in dry-process copying machines.

Further examples include rolls in the above-mentioned fields.

In the food industry plant equipment field, examples of the sealing material include valves, packing members, diaphragms, O (square)-rings and various sealing materials, and these can be used in food production steps. More specifically, the molded articles can be used as plate type heat exchanger seals, vending machine electromagnetic valve seals, and the like.

In the nuclear power plant equipment field, examples include packing members, O-rings, diaphragms, valves, and various seal members.

Examples in the general industry field include packing members, O-rings, diaphragms, valves, and various sealing materials. More specifically, there may be mentioned seals and seals in hydraulic and lubricating systems, bearing seals, window seals and other seals in dry cleaning equipment, seals for uranium hexafluoride enrichment apparatus, seal (vacuum) valves in cyclotrons, seals for automatic packaging machines, diaphragms in pumps (in pollution-monitoring apparatus) for analyzing sulfurous acid gas and chlorine gas in air, and so forth.

In the electric system field, the molded articles can be specifically used as bullet train (Shinkansen) insulating oil caps, liquid-sealed transformer benching seals and the like.

In the fuel cell field, the molded articles can be specifically used as seal materials between electrodes and a separator, seals in hydrogen, oxygen or product water piping systems, and the like.

In the electronic component field, the molded articles can be specifically used as radiator materials, electromagnetic wave shield materials, computer hard disk drive gaskets, and the like.

Those sealing materials which can be used in situ molding are not particularly limited, and examples thereof include engine oil pan gaskets, gaskets for magnetic recording apparatus, and clean room filter unit sealing materials.

The molded articles can be particularly suitably used as gaskets for magnetic recording apparatus (hard disk drives) and sealing materials for clean equipment such as sealing materials in semiconductor manufacturing apparatus or storehouses for wafers or other devices.

Further, the molded articles are particularly suitably used as sealing materials for fuel cells, such as packing members used between fuel cell electrodes or in peripheral piping systems.

Sliding Members:

In the automobile-related fields, examples include piston rings, shaft seals, valve stem seals, crankshaft seals, cam shaft seals, and oil seals.

Generally, there may be mentioned fluororubber products used as parts that slide in contact with other materials.

Non-Stick Members:

Mention may be made of, for example, hard disk crash stoppers in the computer field.

Fields Utilizing Water/Oil Repellency:

Mention may be made of, for example, automobile wiper blades and coated fabrics for outdoor tents.

The following description is offered to illustrate a method for producing a fluororubber molded article of the present invention.

The method for producing a fluororubber molded article of the present invention includes the steps of:

(I) co-coagulating a fluororubber (A) and a fluororesin (B), thereby providing co-coagulated powder, and then preparing a crosslinkable fluororubber composition;

(II) molding and crosslinking the crosslinkable fluororubber composition, thereby providing a crosslinked molded article; and (III) heating the crosslinked molded article to a temperature of not lower than the melting point of the fluororesin (B), thereby providing a fluororubber molded article.

The following describes these steps.

Step (I)

In this step, co-coagulated powder is obtained by co-coagulation of the fluororubber (A) and the fluororesin (B), and then a crosslinkable fluororubber composition is obtained.

The co-coagulation can be accomplished by, for example, (i) mixing an aqueous dispersion of the fluororubber (A) and an aqueous dispersion of the fluororesin (B), and then causing the fluororubber (A) and the fluororesin (B) to coagulate, (ii) adding powder of the fluororubber (A) to the fluororesin (B), and then causing the fluororubber (A) and the fluororesin (B) to coagulate, or (iii) adding powder of the fluororesin (B) to an aqueous dispersion of the fluororubber (A), and then causing the fluororubber (A) and the fluororesin (B) to coagulate.

The method (i) is preferred among the above co-coagulation methods because the resins are more readily dispersed homogeneously.

The coagulation methods (i) to (iii) can be carried out in the presence of a flocculant. Examples of such a flocculant include, but are not limited to, known flocculants including aluminum salts such as aluminum sulfate and alum, calcium salts such as calcium sulfate, magnesium salts such as magnesium sulfate, and monovalent cation salts such as sodium chloride and potassium chloride. In the case where the coagulation is carried out in the presence of a flocculant, the pH may be adjusted with an acid or an alkali in order to accelerate the coagulation.

The fluororubber (A) may require a crosslinking agent depending on its crosslinkable system. Therefore, in one embodiment, the step (I) preferably includes, after preparing co-coagulation powder by co-coagulation of the fluororubber (A) and the fluororesin (B), adding a crosslinking agent to the co-coagulation powder, thereby providing a crosslinkable fluororubber composition.

The co-coagulated powder and the crosslinking agent can be mixed together by conventional methods, for example, using an open roll mill under certain time and temperature conditions which allow them to be sufficiently mixed.

(II) Molding and Crosslinking Step

In this step, the crosslinkable composition obtained in the mixing step (I) is molded and crosslinked into a crosslinked molded article. The order of the molding and the crosslinking is not limited, and the molding may be carried out before the crosslinking, or vice versa. Or, the molding and the crosslinking may be carried out at the same time.

For example, in order to obtain a hose, a long plate, or the like, it is appropriate to perform extrusion molding and then crosslinking. In the case of a molded article of an irregular shape, a crosslinked product with a block shape may be obtained and then subjected to a shaping treatment such as cutting. In the case of a comparatively simple molded article such as a piston ring or an oil seal, a common strategy is to perform molding and crosslinking at the same time using a die or the like.

Examples of molding methods include, but are not limited to, extrusion molding, pressure molding using a die or the like, and injection molding.

The crosslinking can also be performed by common methods, and examples include steam crosslinking, pressure molding, radiation crosslinking, and methods in which the crosslinking reaction is initiated by heating. In the present invention, in order to smoothly move the fluororesin to the surface of the crosslinkable fluororubber composition, crosslinking by heating is preferred.

The methods and conditions for molding and crosslinking the crosslinkable fluororubber composition may be determined within ranges of known methods and conditions depending on the molding and crosslinking techniques to be used.

Preferably, the crosslinking temperature is not lower than the crosslinking temperature of the fluororubber (A), and is lower than the melting point of the fluororesin (B). If the crosslinking is performed at a temperature of not lower than the melting point of the fluororesin (B), the fluororesin (B) may bleed out to the surface in the process of crosslinking molding, resulting in a molded article without enough projecting portions. The crosslinking temperature is more preferably lower than the melting point of the fluororesin (B) by more than 5° C. and not lower than the crosslinking temperature of the fluororubber (A). The time of crosslinking is, for example, 1 minute to 24 hours, and can be appropriately determined depending on the type of the crosslinking agent.

Although some conventional rubber crosslinking processes include a first crosslinking treatment (referred to as primary crosslinking) and a post-crosslinking step (referred to as secondary crosslinking), the molding and crosslinking step (II) and the heat treatment step (III) in the present invention are different from the conventional secondary crosslinking step as illustrated below in the description of the heat treatment step (III).

(III) Heat Treatment Step

In this step, the crosslinked molded article obtained in the molding and crosslinking step (II) is heated at a temperature of not lower than the melting point of the fluororesin (B), thereby providing a fluororubber molded article.

The heat treatment step (III) herein is a treatment for increasing the fluororesin ratio at the surface of the crosslinked molded article. In order to achieve this object, the heating temperature should be not lower than the melting point of the fluororesin (B), and should be lower than the thermal decomposition temperatures of the fluororubber (A) and the fluororesin (B).

If the heating temperature is lower than the melting point of the fluororesin, a crosslinked molded article having a surface with a high fluororesin content may not be obtained. Additionally, in order to avoid thermal decomposition of the fluororubber and the fluororesin, the heating temperature should be lower than the lower one of the thermal decomposition temperatures of the fluororubber (A) and the fluororesin (B). The heating temperature is preferably higher than the melting point of the fluororesin by 5° C. or more because low friction is readily achieved in a short time.

The above upper limit of the temperature is determined for typical fluororubbers, and does not apply to super heat resistant fluororubbers. The upper limit for super heat resistant fluororubbers corresponds to the decomposition temperature of the fluororubbers.

In the heat treatment step (III), the heating temperature and the heating time are closely correlated with each other. Specifically, at a temperature comparatively close to the lower limit, a comparatively long period of heating is preferably performed, while at a temperature comparatively close to the upper limit, a comparatively short period of heating is preferably performed. Although the heating time can be determined based on this relationship with the heating temperature, too long a period of heating may cause thermal deterioration of the fluororubber. Except for highly heat resistant fluororubbers, the heating time is practically up to 96 hours. Typically, the heating time is preferably 1 minute to 72 hours, more preferably 1 minute to 48 hours, and still more preferably 1 minute to 24 hours for good productivity. In order to sufficiently reduce the friction coefficient, the heating time is preferably not shorter than 12 hours.

The conventional secondary crosslinking is a procedure for completely decomposing the remaining crosslinking agent after the primary crosslinking to complete crosslinking of a fluororubber, and improving the mechanical properties and compression set of a crosslinked molded article.

Accordingly, the conventional conditions for the secondary crosslinking are determined without taking into account the presence of the fluororesin (B). Therefore, even if these conditions accidentally overlap the heating conditions of the heat treatment step of the present invention, the ranges of the heating conditions of the secondary crosslinking are determined to achieve the goal of completing crosslinking of the fluororubber (complete decomposition of crosslinking agents) without taking into account the presence of the fluororesin, and do not always coincide with the conditions in the presence of the fluororubber (B) under which the fluororesin (B) in a rubber crosslinked product (not in a rubber uncrosslinked product) is softened or molten by heating.

In the molding and crosslinking step (II) in the present invention, in order to complete crosslinking of the fluororubber (A) (completely decompose the crosslinking agent), secondary crosslinking may be performed.

Although crosslinking of the fluororubber (A) may be completed as a result of decomposition of the remaining crosslinking agent in the heat treatment step (III), the crosslinking of the fluororubber (A) is just a secondary reaction in the heat treatment step (III).

The production method of the present invention provides fluororubber molded articles that are strikingly improved in terms of properties attributed to the fluororesin, such as low friction, non-stick properties, and water/oil repellency, compared to articles obtained without performing a heat treatment. Additionally, the resulting fluororubber molded articles, except the surface, show good properties attributed to the fluororubber, and therefore are entirely excellent in low compression set, low friction, non-stick properties, and water/oil repellency in a balanced manner. Moreover, since there is no clear interface between the fluororesin and the fluororubber in the resulting fluororubber molded articles, surface portions rich in the fluororesin will not come off or chip off. Namely, the fluororubber molded articles are better in terms of durability than conventional molded articles that have a fluororubber surface modified by coating with a fluororesin or adhesion of a fluororesin.

EXAMPLES

The following examples are offered to illustrate the present invention in more detail, but are not to be construed as limiting the present invention.

The physical properties reported herein were measured by the following methods.

(1) Monomer Composition of Fluororesin

The monomer composition of fluororesins was determined by $^{19}$F-NMR analysis at the temperature of (melting point of a polymer+50)° C. using a nuclear magnetic resonance apparatus AC 300 (Bruker-Biospin Co., Ltd.).

(2) Melting Point of Fluororesin

The melting point of fluororesins was determined from a peak of an endothermic curve obtained by a thermal measurement where the temperature was increased at a rate of 10° C./minute to (the temperature at which the endothermal reaction ends+30)° C., and decreased at a rate of −10° C./min to 50° C., and then increased again at a rate of 10° C./minute to (the temperature at which the endothermal reaction ends+30)° C. using a differential scanning calorimeter RDC220 (Seiko Instruments Inc.) in accordance with ASTM D-4591.

(3) Melt Flow Rate [MFR] of Fluororesin

The MFR of fluororesins was determined as the mass (g/10 minutes) of a polymer flowing out from a nozzle (inner diameter; 2 mm, length: 8 mm) for 10 minutes at 280° C. under a load of 5 kg, and was measured using Melt Indexer (Toyo Seiki Seisaku-sho, Ltd.) in accordance with ASTM D3307-01.

(4) Storage Elastic Modulus (E') of Fluororesin

The storage elastic modulus of fluororesins was determined at 70° C. by a dynamic viscoelasticity analysis, and specifically was determined by analyzing a sample with a length of 30 mm, a width of 5 mm, and a thickness of 0.25 mm using a dynamic viscoelasticity analyzer DVA 220 (IT keisoku seigyo K.K.) in a tensile mode with a supporting span of 20 mm at a temperature increase rate of 2° C./min from 25° C. to 200° C. at 1 Hz.

(5) Thermal Decomposition Onset Temperature (1% by Mass Loss Temperature) of Fluororesin The thermal decomposition onset temperature of fluororesins was determined as the temperature at which a fluororesin under a heating test loses 1% of the mass, using a thermogravimetric/differential thermal analyzer (TG-DTA).

(6) Crosslinking (Vulcanization) Properties

The lowest torque (ML), highest torque (MH), induction time (T10) and optimum vulcanization time (T90) were measured using a type II curastometer (JSR Corporation).

(7) 100% Modulus (M100)

Measured in accordance with JIS K 6251.

(8) Tensile Strength at Break (Tb)

Measured in accordance with JIS K 6251.

(9) Tensile Elongation at Break (Eb)

Measured in accordance with JIS K 6251.

(10) Hardness (Shore A)

Measured in accordance with JIS K 6253 using a type A durometer (peak value).

(11) Dynamic Friction Coefficient

A friction player FPR2000 available from Rhesca Corporation (provided with a φ 5 mm pin made of SUJ2) was used for the measurement in a revolution mode at 20 g of weight, at 120 rpm and at 10 mm of radius of gyration. When the friction coefficient became stable 5 minutes or more after the start of rotation, the measured value was recorded as a coefficient of dynamic friction.

(12) Compression Set

The compression set was measured after exposure to 200° C. for 70 hours in accordance with JIS K 6262.

(13) Area Ratio of Area Covered with Projecting Portion, Height of Projecting Portion, Bottom Cross-Sectional Area of Projecting Portion, and Number of Projecting Portions The area ratio of areas covered with projecting portions, height of projecting portions, bottom cross-sectional area of projecting portions, and number of projecting portions were calculated using, for example, a color 3D laser microscope (VK-9700) available from Keyence Corporation and an analysis software WinRooF Ver. 6.4.0 available from Mitani. Corporation. The area ratio of areas covered with projecting portions was determined by determining the bottom cross-sectional areas of projecting portions, and calculating the proportion of the total of the cross-sectional areas to the area of the entire measured region. The number of projecting portions was determined by converting the number of projecting portions in the measured region to the number of projecting portions per mm$^2$.

Materials shown in Tables and used herein are described below.

Fluororubber (A)

Polyol crosslinkable binary fluororubber (G7400BP from Daikin Industries, Ltd.)

(Filler)

Carbon black (MT carbon from Cancarb: N990)

(Crosslinking Agent)

Bisphenol AF of special grade (from Wako Pure Chemical Industries, Ltd.)

BTPPC of special grade (from Wako Pure Chemical Industries, Ltd.)

(Crosslinking Aid)

Magnesium oxide MA150 from Kyowa Chemical Industry Co., Ltd.

Calcium hydroxide, CALDIC2000 from Ohmi Chemical Industry Co., Ltd.

Synthesis 1 Fluororesin (B1)

A 3-L stainless steel autoclave provided with an agitator was charged with deionized water (1767 g), a 50% aqueous solution of a fluorine-containing allyl ether compound represented by $CH_2=CFCF_2-O-(CF(CF_3)CF_2O)-CF(CF_3)-COONH_4$ (0.283 g, i.e. 80 ppm of deionized water), a 50% aqueous solution of a fluorine-containing anionic surfactant represented by $F(CF_2)_5COONH_4$ (3.53 g, i.e. 1000 ppm of deionized water). The autoclave was evacuated under vacuum, and purged with nitrogen. To this autoclave, hexafluoropropylene [HFP] was introduced to increase the pressure to 3.5 MPa, and the temperature was increased to 95° C. Subsequently, HFP and TFE were fed to increase the pressure to 4.0 MPa. Then, a 3.0% by mass ammonium persulfate aqueous solution (16 g, polymerization initiator) was forced into the autoclave to initiate polymerization. The pressure began to decrease 5 minutes after the polymerization initiator was forced into the autoclave. In order to maintain the pressure in the polymerization tank at 4.0 MPa, mixture gas of TFE/HFP=91/9 (molar basis) was supplied during the polymerization reaction. Additionally, in order to maintain the polymerization rate, the 3.0% by mass ammonium persulfate aqueous solution was forced into the autoclave constantly from the start to the end of polymerization. The amount of the solution added reached 35 g. The agitation was stopped 5 hours after the start of polymerization, and gaseous monomers were discharged to stop the reaction. Then, the reactor was cooled to room temperature to afford a white TFE/HFP copolymer [FEP] dispersion (emulation) (2200 g). A portion of the emulsion was dried and measured for solids content. The solids content was 20.1%.

A 300 g portion of the dispersion was diluted to ½, and combined with aluminum sulfate to give a precipitate. Then, the slurry was filtered, and the recovered slurry was washed by dispersing the slurry in 1 L of deionized water and then filtering the slurry again. This washing procedure was repeated three times. The slurry was then dried at 110° C. to afford the polymer (58 g).

The obtained polymer had the following composition and physical properties.
TFE/HFP=84.7/15.3 (molar basis)
Melting point: 186° C.
MFR: 7.5 g/10 min (280° C., 5 kg)
Storage elastic modulus (E') at 70° C.: 59 MPa
Thermal decomposition onset temperature (1% by mass loss temperature): 371° C.

Synthesis 2 Fluororesin (B2)

A 3-L stainless steel autoclave provided with an agitator was charged with deionized water (1767 g), a 50% aqueous solution of a fluorine-containing allyl ether compound represented by $CH_2=CFCF_2-O-(CF(CF_3)CF_2O)-CF(CF_3)-COONH_4$ (0.283 g, i.e. 80 ppm of deionized water), a 50% aqueous solution of a fluorine-containing anionic surfactant represented by $F(CF_2)_5COONH_4$ (3.53 g, i.e. 1000 ppm of deionized water). The autoclave was evacuated under vacuum, and purged with nitrogen. To this autoclave, hexafluoropropylene [HFP] was introduced to increase the pressure to 3.5 MPa, and perfluoro(propyl)vinyl ether [PPVE] (17 g) was also forced thereinto, and the temperature was increased to 95° C. Subsequently, HFP and TFE were fed to increase the pressure to 4.0 MPa. Then, a 3.0% by mass ammonium persulfate aqueous solution (16 g, polymerization initiator) was forced into the autoclave to initiate polymerization. The pressure began to decrease 5 minutes after the polymerization initiator was forced into the autoclave. In order to maintain the pressure in the polymerization tank at 4.0 MPa, mixture gas of TFE/HFP=91/9 (molar basis) was supplied during the polymerization reaction. Additionally, in order to maintain the polymerization rate, the 3.0% by mass ammonium persulfate aqueous solution was forced into the autoclave constantly from the start to the end of polymerization. The amount of the solution added reached 35 g. The agitation was stopped 5 hours after the start of polymerization, and gaseous monomers were discharged to stop the reaction. Then, the reactor was cooled to room temperature to afford a white TFE/HFP/PPVE copolymer [FEP] dispersion (emulsion) (2210 g).

A portion of the emulsion was dried and measured for solids content. The solids content was 20.3%.

A 300 g portion of the dispersion was diluted to ½, and combined with aluminum sulfate to give a precipitate. Then, the slurry was filtered, and the recovered slurry was washed by dispersing the slurry in 1 L of deionized water and then filtering the slurry again. This washing procedure was repeated three times.

The slurry was then dried at 110° C. to afford the polymer (55 g).

The obtained polymer had the following composition and physical properties.
TFE/HFP/PPVE=85.5/13.5/1.0 (molar basis)
Melting point: 188° C.
MFR: 8.1 g/10 min (280° C., 5 kg)
Storage elastic modulus (E ) at 70° C.: 68 MPa
Thermal decomposition onset temperature (1% by mass loss temperature): 369° C.

Synthesis Reference 1

A 3-L stainless steel autoclave provided with an agitator was charged with deionized water (1767 g), a 50% aqueous solution of a fluorine-containing allyl ether compound represented by $CH_2=CFCF_2-O-(CF(CF_3)CF_2O)-CF(CF_3)-COONH_4$ (0.283 g, i.e. 80 ppm of deionized water), a 50% aqueous solution of a fluorine-containing anionic surfactant represented by $F(CF_2)_5COONH_4$ (3.53 g, i.e. 1000 ppm of deionized water). The autoclave was evacuated under vacuum, and purged with nitrogen. To this autoclave, hexafluoropropylene [HFP] was introduced to increase the pressure to 3.4 MPa, and the temperature was increased to 95° C. Subsequently, HFP and TFE were fed to increase the pressure to 4.2 MPa. Then, a 3.0% by mass ammonium persulfate aqueous solution (16 g, polymerization initiator) was forced into the autoclave to initiate polymerization. The pressure began to decrease 5 minutes after the polymerization initiator was forced into the autoclave. In order to maintain the pressure in the polymerization tank at 4.2 MPa, mixture gas of TFE/HFP=91/9 (molar basis) was supplied during the polymerization reaction. Additionally, in order to maintain the polymerization rate, the 3.0% by mass ammonium persulfate aqueous solution was forced into the autoclave constantly from the start to the end of polymerization. The amount of the solution added reached 35 g. The agitation was stopped 2 hours after the start of polymerization, and gaseous monomers were discharged to stop the reaction. Then, the reactor was cooled to room temperature to afford a white TFE/HFP copolymer [FEP] dispersion (emulsion) (2192 g). A portion of the emulsion was dried and measured for solids content. The solids content was 20.1%.

A 300 g portion of the dispersion was diluted to ½, and combined with aluminum sulfate to give a precipitate. Then, the slurry was filtered, and the recovered slurry was washed by dispersing the slurry in 1 L of deionized water and then filtering the slurry again. This washing procedure was repeated three times. The slurry was then dried at 110° C. to afford the polymer (58 g).

The obtained polymer had the following composition and physical properties.
TFE/HFP=87.9/12.1 (molar basis)
Melting point: 215° C.
MFR: 6.8 g/10 min (280° C., 5 kg)
Storage elastic modulus (E ) at 70° C.: 167 MPa
Thermal decomposition onset temperature (1% by mass loss temperature): 398° C.

Example 1

The FEP aqueous dispersion (B1) and the fluororubber dispersion (A1) were preliminary mixed into a solution with a volume ratio (fluororubber solids/FEP solids) of 75/25. A 400 cc portion of this solution was added to a preliminary prepared solution of 4 g of magnesium chloride in 500 cc of water in a 1-L mixer and mixed therein for 5 minutes to cause the solids to co-coagulate.

After the co-coagulation, the solids were recovered, and dried in a drying kiln at 120° C. for 24 hours, and predetermined materials shown in Table 1 were mixed with the solids using an open roll mill. In this manner, a crosslinkable fluororubber composition was prepared. The composition was then crosslinked into a primary crosslinked article in a molding die at 180° C. for 5 minutes at an elevated pressure of 40 kg/cm². The primary molded article was then heated in an oven constantly maintained at 230° C. for 24 hours. In this manner, a molded article sample was prepared. Table 1 shows the physical properties of the molded article.

Example 2

A molded article sample was prepared in the same manner as in Example 1 except that the FEP aqueous dispersion (B2) prepared in Synthesis 2 was used instead of the FEP aqueous dispersion (B1) prepared in Synthesis 1. Table 1 shows the physical properties of the molded article.

Reference 1

A molded article sample was prepared in the same manner as in Example 1 except that the FEP aqueous dispersion prepared in Synthesis reference 1 was used instead of the FEP aqueous dispersion (B1) prepared in Synthesis 1. Table 1 shows the physical properties of the molded article.

TABLE 1

|  |  | Example 1 | Example 2 | Reference 1 |
|---|---|---|---|---|
| Fluororubber and fluororesin (parts by mass) | | 100 | 100 | 100 |
| Bisphenol AF (parts by mass) | | 1.6 | 1.6 | 2.2 |
| BTPPC (parts by mass) | | 0.3 | 0.3 | 0.4 |
| MgO (parts by mass) | | 2.25 | 2.25 | 3 |
| Calcium hydroxide (parts by mass) | | 4.5 | 4.5 | 6 |
| Carbon black (parts by mass) | | 0.75 | 0.75 | 1 |
| Physical properties in ordinary state | Strength at break [MPa] | 12.1 | 13 | 13.9 |
| | Elongation at break [%] | 328 | 330 | 349 |
| | M100 [MPa] | 3.4 | 3.4 | 3.5 |
| | Hardness [ShoreA] | 79.1 | 80 | 81.1 |
| Compression set (200° C. × 70 h) [%] | | 29.9 | 30 | 43 |
| Dynamic friction coefficient | | 0.97 | 0.96 | 0.98 |
| Area ratio of area covered with projecting portion [%] | | 36.5 | 37.2 | 38.7 |
| Height of projecting portion [μm] | | 0.43 to 1.88 | 0.45 to 1.95 | 0.44 to 1.91 |
| Bottom cross-sectional area of projecting portion [μm$^2$] | | 3.8 to 199.2 | 3.8 to 197.5 | 3.7 to 197.7 |
| Number of projecting portions [/mm$^2$] | | 8893 | 8905 | 8901 |

INDUSTRIAL APPLICABILITY

Fluororubber molded articles of the present invention are suitably used as, in particular, sealing materials, sliding members, and non-stick members.

REFERENCE SIGNS LIST

30: Fluororubber molded article
31: Projecting portion

The invention claimed is:

1. A crosslinkable fluororubber composition comprising:
a fluororubber (A); and
a fluororesin (B),
wherein the fluororesin (B) is a copolymer (B1) consisting of tetrafluoroethylene units (a) and hexafluoropropylene units (b) or a copolymer (B2) comprising tetrafluoroethylene units (a), hexafluoropropylene units (b), and polymerized units (c) derived from a monomer copolymerizable with tetrafluoroethylene and hexafluoropropylene,
the copolymer (B1) satisfies the condition that the ratio (a)/(b) is (80.0 to 87.3)/(12.7 to 20.0) on a molar basis, and
the copolymer (B2) satisfies the condition that the ratio (a)/(b) is (80.0 to 90.0)/(10.0 to 20.0) on a molar basis, and the ratio (c)/{(a)+(b)} is (0.1 to 10.0)/(90.0 to 99.9) on a molar basis,
wherein the fluororesin (B) has a storage elastic modulus (E'), as determined by a viscoelasticity analysis at 70° C., of 10 to 160 MPa.

2. The crosslinkable fluororubber composition according to claim 1,
wherein the crosslinkable fluororubber composition comprises co-coagulated powder comprising a co-coagulation of the fluororubber (A) and the fluororesin (B), and the fluororesin (B) is the copolymer (B1).

3. The crosslinkable fluororubber composition according to claim 1,
wherein the crosslinkable fluororubber composition comprises co-coagulated powder comprising a co-coagulation of the fluororubber (A) and the fluororesin (B), and the fluororesin (B) is the copolymer (B2).

4. The crosslinkable fluororubber composition according to claim 1,
wherein the polymerized units (c) of the fluororesin (B) are units derived from a perfluoro(alkyl vinyl ether).

5. The crosslinkable fluororubber composition according to claim 1,
wherein the fluororesin (B) has a melting point of not higher than 210° C.

6. The crosslinkable fluororubber composition according to claim 1,
wherein the fluororubber (A) is at least one selected from the group consisting of vinylidene fluoride/hexafluoropropylene copolymers, vinylidene fluoride/hexafluoropropylene/tetrafluoroethylene copolymers, tetrafluoroethylene/propylene copolymers, tetrafluoroethylene/propylene/vinylidene fluoride copolymers, ethylene/hexafluoropropylene copolymers, ethylene/hexafluoropropylene/vinylidene fluoride copolymers, ethylene/hexafluoropropylene/tetrafluoroethylene copolymers, vinylidene fluoride/tetrafluoroethylene/perfluoro(alkyl vinyl ether) copolymers, and vinylidene fluoride/chlorotrifluoroethylene copolymers.

7. The crosslinkable fluororubber composition according to claim 1,
wherein the fluororubber (A) comprises copolymerized units derived from a crosslinking-site-imparting monomer.

8. A fluororubber molded article comprising a crosslinked crosslinkable fluororubber composition according to claim 1.

9. A method for producing a fluororubber molded article, comprising the steps of:
(I) co-coagulating a fluororubber (A) and a fluororesin (B), thereby providing co-coagulated powder, and then preparing a crosslinkable fluororubber composition according to claim 1;
(II) molding and crosslinking the crosslinkable fluororubber composition, thereby providing a crosslinked molded article; and
(III) heating the crosslinked molded article to a temperature of not lower than the melting point of the fluororesin (B), thereby providing a fluororubber molded article.

10. A fluororubber molded article obtained by the production method according to claim 9.

11. The fluororubber molded article according to claim 8, wherein the fluororubber molded article is a sealing material.

12. The fluororubber molded article according to claim 8, wherein the fluororubber molded article is a sliding member.

13. The fluororubber molded article according to claim 8, wherein the fluororubber molded article is a non-stick member.

14. The fluororubber molded article according to claim 8, wherein the fluororubber molded article has a water/oil repellent surface.

\* \* \* \* \*